Feb. 15, 1966  A. STERNOFF ETAL  3,234,837
SCRAP SHEAR FEED MECHANISM WITH FLOATING OVERHEAD PRESS MEMBER
Filed Sept. 11, 1963  4 Sheets-Sheet 1

ARTHUR STERNOFF
ARTHUR F. RICHARDS
GUY R. COE JR.
INVENTORS
BY
Seed & Berry
ATTORNEYS

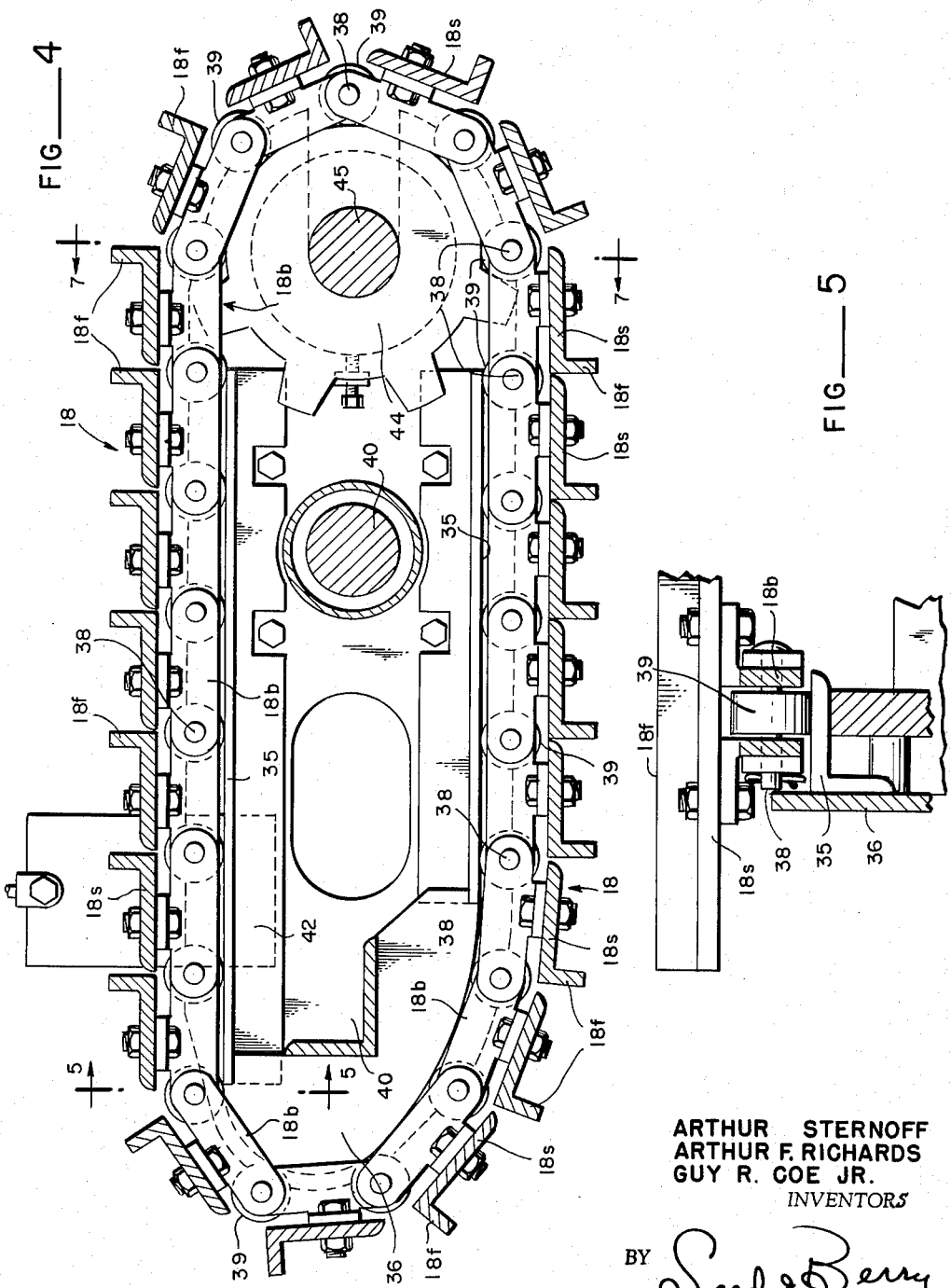

Feb. 15, 1966  A. STERNOFF ETAL  3,234,837
SCRAP SHEAR FEED MECHANISM WITH FLOATING OVERHEAD PRESS MEMBER
Filed Sept. 11, 1963  4 Sheets-Sheet 3

ARTHUR STERNOFF
ARTHUR F. RICHARDS
GUY R. COE JR.
INVENTORS.

BY Seed & Berry

ATTORNEYS

Feb. 15, 1966    A. STERNOFF ETAL    3,234,837
SCRAP SHEAR FEED MECHANISM WITH FLOATING OVERHEAD PRESS MEMBER
Filed Sept. 11, 1963    4 Sheets-Sheet 4
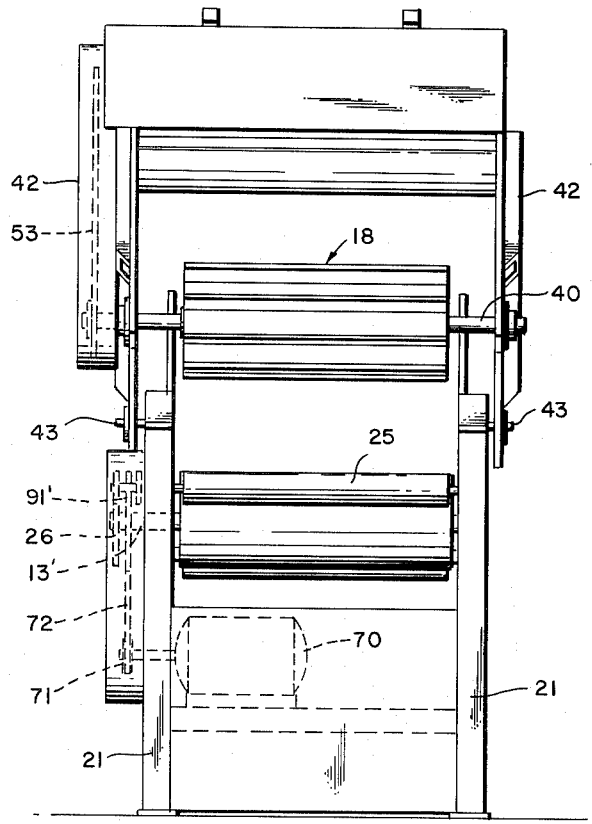
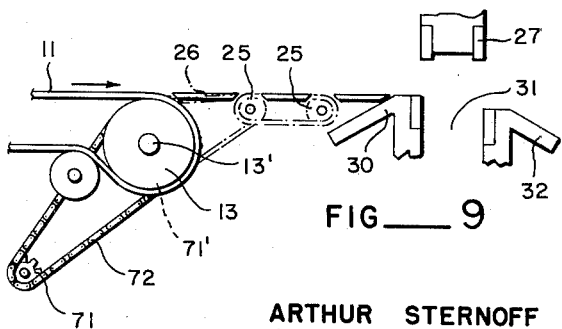
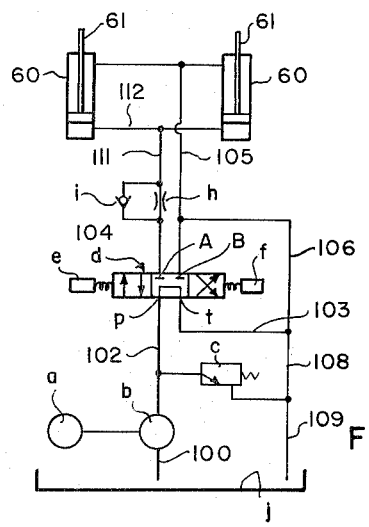
ARTHUR STERNOFF
ARTHUR F. RICHARDS
GUY R. COE JR.
INVENTORS
BY *Seed & Berry*
ATTORNEYS : 3,234,837
SCRAP SHEAR FEED MECHANISM WITH FLOATING OVERHEAD PRESS MEMBER
Arthur Sternoff and Arthur F. Richards, Seattle, and Guy R. Coe, Jr., Mercer Island, Wash., assignors to Richards Shear Company, Seattle, Wash., a corporation of Washington
Filed Sept. 11, 1963, Ser. No. 308,189
3 Claims. (Cl. 83—422)

This invention relates to apparatus designed for the progressive advancement of pieces of scrap metal or similar materials, to a machine such as for example, to a powered shear that is operated to cut the advanced scrap material into smaller pieces for easier handling, hauling, or for smelting.

More particularly, the present invention resides in the combination with a belt conveyor, of a scrap feeding and hold down belt mechanism whereby scrap metal pieces of various sizes, shapes and in promiscuous order of advancement by the belt conveyor may be advanced therefrom between the coacting jaws of a metal shear for cutting thereby into smaller pieces.

It is the principal object of this invention to provide an overriding hold down belt mechanism or device, for use in conjunction with a main conveyor feed belt that advances the scrap metal pieces, in their various sizes, shapes and formations to the entrance or mouth of the shear and there coacts with the hold down belt to effect the progressive and positive advancement of the scrap to a position beneath the shear head and act as a shock absorber against rebound or kick-back, of the scrap metal when it is engaged and cut by the coacting shear blades, incident to closing of the shear.

It is also an object of this invention to provide a scrap metal feeding mechanism of the above stated character wherein the said hold down belt is of crawler tread type similar to the crawler track of a tractor or bulldozer and is poistioned above and in opposed relationship to the scrap metal feeding conveyor belt to move therewith; to engage and firmly but yieldingly hold the advanced scrap pieces, against rebound or kick-back incident to the shearing action and which crawler type belt is supported in its functional position by means that accommodates its rise and fall and necessary endwise rocking or teetering movements to the various sizes, shapes and froms of pieces advanced beneath it.

Another object of the invention is to provide driving means for the operation of the present crawler tread type, overriding hold down belt that may be reversed in its normal driving direction to effect the pulling back of jammed scrap pieces from between the jaws of the shear when such pulling becomes necessary or advisable.

It is a further object of this invention to provide a system including push button controls for the various operations of the mechanism, whereby the mechanism is rendered automatic, in so far as belt travel direction and mode of operation is concerned.

Further objects and advantages reside in the details of construction of various parts of the mechanism; in the combination of parts and in their mode of operation, as will hereinafter be described.

In accomplishing the above mentioned and other objects, we have provided the improved details of construction and combinations; the preferred forms of which are illustrated in the accompanying drawings, wherein:

FIG. 4 is an enlarged, longitudinal, sectional view, taken on line 4—4 of FIG. 2, of the overriding hold down belt as associated with the discharge end portion of the scrap feeding belt.

FIG. 5 is an enlarged, cross-sectional detail, taken in the transverse plane of line 5—5 in FIG. 4.

FIG. 8 is an elevation of the scrap feed belt mechanisms as seen from the discharge end of the mechanism.

FIG. 9 is a vertical, sectional detail taken on line 9—9 in FIG. 8, showing the driven rolls of the conveyor as located at the entrance side of the shear.

FIG. 10 is a schematic diagram of the controls used with the conveyor mechanism.

Figure 1:
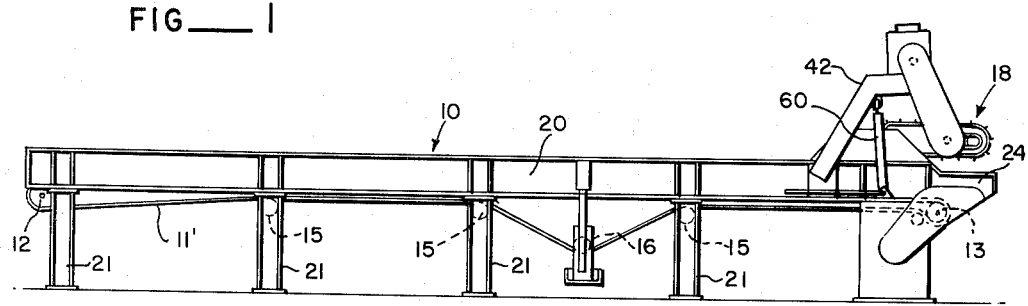
FIG. 1 is a side view of the scrap metal feeding and conveying system of the present invention.
Figure 2:
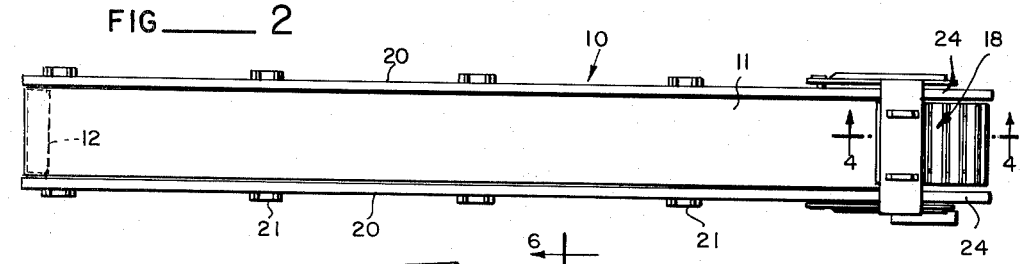
FIG. 2 is a plan or top view of the conveyor system shown in FIG. 1.

Referring more in detail to the drawings:

The scrap feeding mechanisms featured herein are shown in FIGS. 1 and 2 to comprise an elongated, horizontally travelling conveyor belt that is mounted by and for operation along a supporting frame structure and on which belt scrap metal pieces are to be conveyed to a metal shear, or the like. In these views, the elongated frame structure is designated in its entirety by reference numeral 10; the continuous conveyor belt is designated by numeral 11 and it is shown as being mounted horizontally for travel and passes, at its opposite ends, respectively, about driven supporting rolls 12 and 13 that are rotatably mounted across opposite end portions of the frame structure 10.

The lower run 11' of this belt is supported for travel on cross-rolls 15 located in spaced relationship therealong. Between two adjacent rolls 15—15, this lower run of the belt passes beneath a belt tensioning roll 16 that may be adjusted by conventional means to maintain the desired belt tension.

The scrap feeding belt device that is featured herein as the "overriding" or "hold down" belt is designated in its entirety by reference numeral 18, and the shear to which the scrap metal is fed is designated by numeral 19.

It will here be explained that the metal shear 19, here shown only in part, per se, forms no particular part of the present invention, but has been herein shown for better understanding of the character and purpose of the present overriding hold down belt 18 as used to advance the scrap material thereto. The shear 19, preferably is of the general character of that of U.S. Patent 3,039,343, issued June 19, 1962, but may be of any other character suitable for this operation.

It will be understood, by reference to FIGS. 1 and 2, of the present drawings, that the belt mounting main frame structure 10 embodies laterally spaced, coextensive opposite side beams 20—20 of channel formation, that are faced outwardly and are supported in the same horizontal plane by a plurality of transversely disposed leg frames 21, located at predetermined intervals of spacing therealong. The conveyor belt 11 preferably is of metal mesh formation, of a width corresponding to the spacing of the side beams 20—20 and its top run is supported between the beams for travel and at its opposite ends passes about the previously mentioned supporting rolls 12 and 13, with its lower run passed below the belt tensioning roll 16.

At its discharge end, immediately adjacent the shear 19, the conveyor frame structure 10 is equipped at opposite sides, with extending brackets 24—24 between which a pair of horizontal feed rollers 25—25 are mounted at the level of the discharge run of belt 11 to cooperate therewith in advancing scrap to the jaws of the shear. These two rollers are rotatably driven in unison, as indicated in FIGS. 3 and 9, by sprocket chain belt connections 26 and 26' with the supporting cross shaft 13' of belt mounting roll 13 as also shown in FIG. 3.

Figure 3:
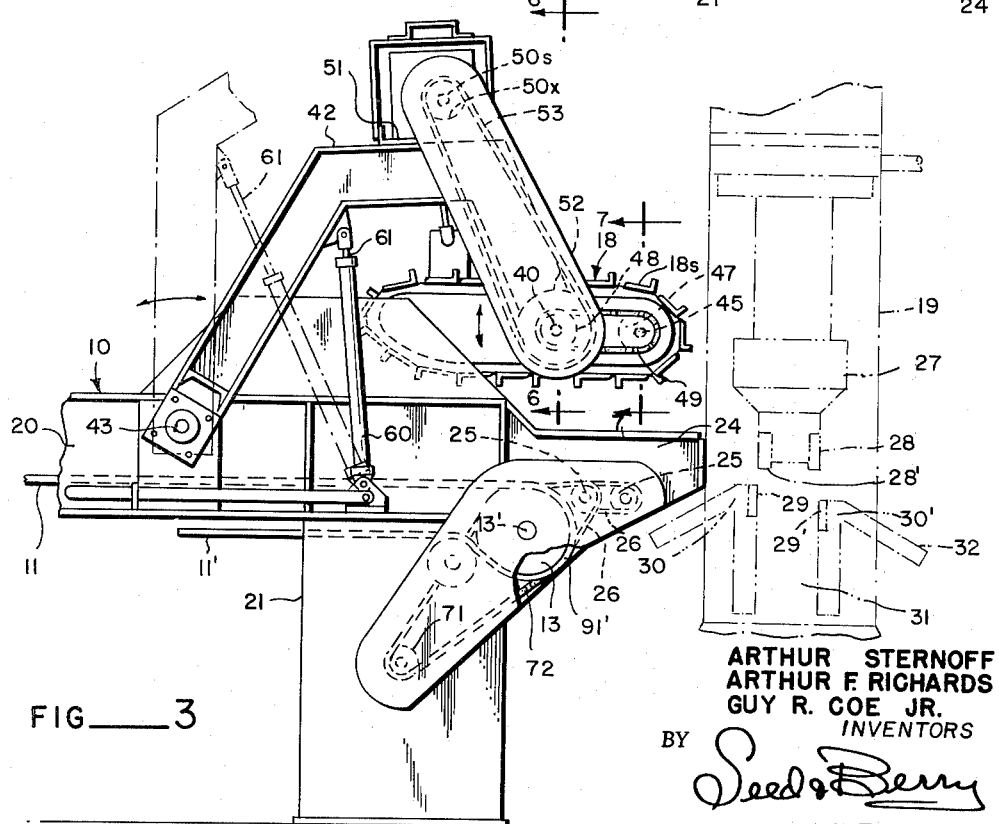
FIG. 3 is an enlarged side view of the discharge end portion of the present scrap conveyor and feed mechanism as used in association with a scrap metal shear; parts of which shear are illustrated in dot-dash lines.

In the showing of part of the shear 19 in FIG. 3, a vertically reciprocating transversely disposed shear head is designated by numeral 27 and it is shown as being equipped at opposite side edges with blades 28—28' that are caused, with the downward travel of the head 27 from its raised or open position, to coact with blades 29—29' mounted on anvils 30—30' that are spaced to provide a downward passage 31 between them for the discharge of cut pieces of scrap. At the discharge side of anvil 30' is a drop off apron 32 for catching the extended end portions of scrap pieces as cut from material advanced beyond the anvil 30'.

Supported over the discharge end portions of the belt 11 and its supporting frame structure 10, is the presently featured scrap feeding hold down belt device which has been designated in its entirety in FIG. 1 by reference numeral 18. This will now be described in detail.

The device 18, comprises, a continuous feed belt, simulating the construction and operation of a crawler type tractor tread. It is comprised of a plurality of transverse traction shoes or plates 18s that are hingedly joined edge to edge, in succession, by their fixed attachment to a pair of continuous, laterally spaced link belts 18b that are adapted for travel on trackway 35 formed along the peripheral edge portions of laterally spaced opposite side frames 36—36 comprised in the frame structure of the unitary device 18. This hold down belt, as seen in FIG. 2, has a width approximately equalling that of belt 11 and each of its transversely directed shoes or plates 18s is formed along one edge with an outwardly projecting flange 18f to facilitate its scrap feeding facility.

As best shown in FIG. 4, the adjacent links of the two link belts 18b are joined at their ends as shown in FIG. 5, by pivot bolts 38, which mount rollers 39 which travel on the trackways 35 provided on the opposite side plates 36—36, as in FIGS. 4 and 5.

Figure 6:
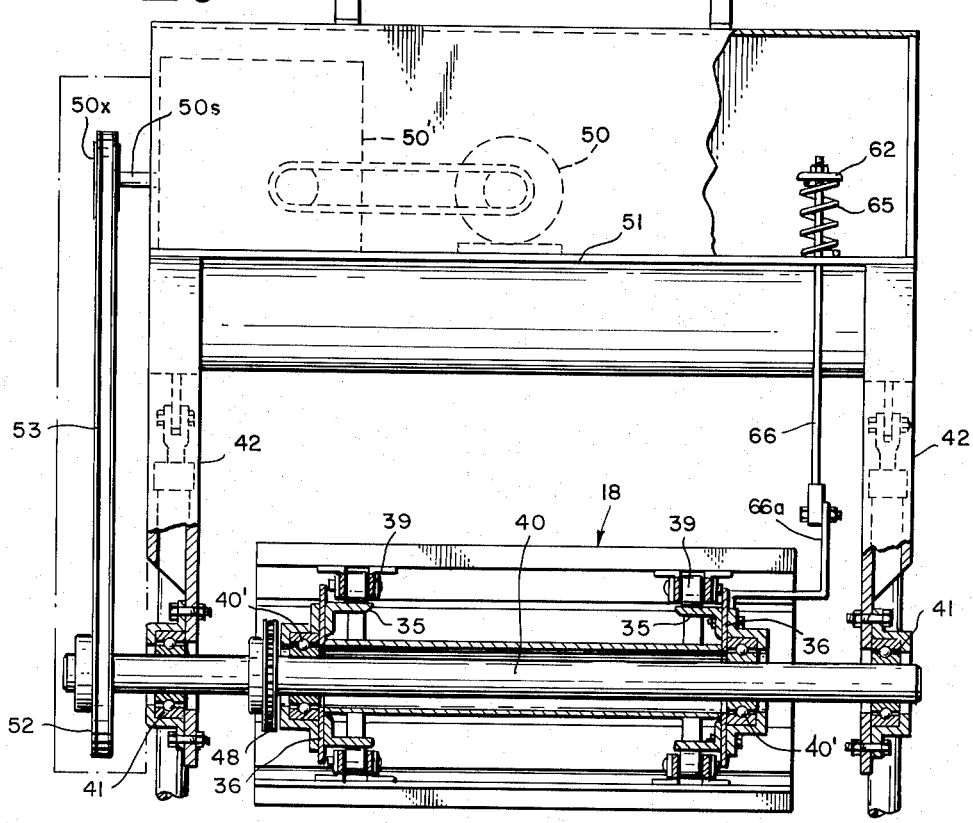
FIG. 6 is an enlarged cross-sectional detail taken on line 6—6 in FIG. 3.

The unitary crawler tread belt structure 18 is supported parallel with the belt 11, for limited endwise rocking action on a cross shaft 40, as best shown in FIG. 6. This cross-shaft extends horizontally and transversely through roller bearings mounted on the opposite side frames 36—36 of the unitary structure 18. Beyond these bearings, the opposite ends of the shaft 40 rotatably support thereon, by means of ball bearings 41, the outer end portions of a pair of laterally spaced angular arms 42—42 which, as shown in FIGS. 1 and 3 and 6, are pivotally mounted at their forward or inner ends, as at 43 in FIG. 3, on the opposite frame beams 20—20 of the conveyor supporting structure 10.

It will be understood, by reference to FIG. 3, that the unit 18 can pivot on its mounting cross shaft 40 and the entire unit may rock, rise or fall relative to belt 11, to accommodate its position to the scrap pieces being advanced beneath it; this being by reason of the pivotally mounting of the unit supporting arms 42—42 on the main frame and the pivotal mounting of the unit on cross-shaft 40.

Figure 7:
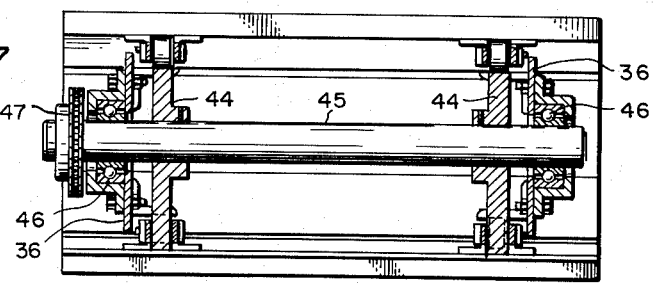
FIG. 7 is a vertical cross-section, taken on line 7—7 in FIG. 3.

The crawler tread driving belts 18b operate at the discharge end of the unit 18 about a pair of sprocket wheels 44—44 that are fixedly mounted on a driving shaft 45 that extends through and beyond the opposite side frames 36—36, as shown in FIG. 7; being rotatably mounted in these frames by ball bearing raceways 46. At one end, the cross-shaft 45 is equipped with a driving sprocket wheel 47 in alignment with a sprocket wheel 48 fixed on cross-shaft 40. A sprocket chain belt 49 operates about sprockets 47 and 48 thus to complete the driving connection between shafts 40 and 45.

The power means for driving the crawler tread type belt of unit 18 comprises an electric motor 50 which is mounted above the unit on a base or platform 51 that is mounted by and extends between the unit support arm 42—42 as best shown in FIGS. 3 and 6. It is shown in FIG. 6 that the motor 50 operates through a reduction gear mechanism, indicated at 50', which has a laterally extending shaft 50s that mounts a sprocket wheel 50x in alignment with a sprocket wheel 52 fixed on shaft 40. A sprocket chain belt 53 is passed over sprockets 50x and 52 and completes the connection for the driving of the crawler tread feed belt through the sprocket chain belt connection 53 and 49. The direction of driving of the crawler tread belt of unit 18 is controlled through the adjustment of driving gears in the gear reduction unit 50'.

The weight of the unit 18 as supported between the outer ends of the two arms 42—42 is ample to hold the crawler belt firmly against the scrap material as advanced beneath it by the conveyor belt 11 and the two driven rollers 25—25. To lift the unit 18 above and clear of advancing scrap when such is desired, a pair of hydraulic cylinder 60—60 is provided. These cylinders are located substantially upright at opposite sides of a supporting frame 21 on beams 20—20 at the discharge end of the main frame structure 10 and have piston rods 61—61 extended upwardly therefrom, pivotally connected with corresponding arms 42. When hydraulic pressure medium is admitted to the lower ends of these cylinders, the rods 61 will be extended to lift the arms 42—42 and the entire unit, as has been indicated by the dash line showing of arm 42 in FIG. 3.

A means has also been provided to prevent free pivotal or teetering action of the unit 18 on shaft 40 when lifted by said arms 42—42 clear of the scrap or conveyor belt 11. This means as best shown in FIG. 6, comprises a coiled spring cushion 65 applied about a hanger rod 66 that is pivotally attached at its lower end by a lateral arm 66a, to the forward portion of a side frame structure of the unit, and extended upwardly through a hole in the mounting base plate 51 of the motor 50. This rod mounts the coil spring 65 thereon between the base plate 51 and a stop plate 62 applied and secured to the upper end of the hanger rod. This hanger rod prevents the forward or heavier end of the unit 18 from swinging down beyond a limited degree when the two arms 42—42 are actuated to the dash line position in FIG. 3.

The means here shown for driving the belt 11 and rolls 25—25 to deliver scrap placed thereon to the shear comprises an electric motor 70 that is mounted at the discharge end of the main frame structure between the legs of a leg frame structure 21 as in FIG. 8. A sprocket 71 is fixed to the drive shaft of this motor in alignment with a sprocket wheel 91' on the extended end of shaft 13' and a chain belt 72 operates about these sprocket wheels as observed in FIG. 3, to complete the driving connection.

In the use of the present conveyor mechanism for the feeding of scrap material to the shear 19, pieces of scrap of various sizes and shapes are placed on the belt 11 and are progressively advanced thereby, by intermittent advance movements of the belt, across the two rollers 25—25, to the mouth of the shear aided by the coaction of the overriding belt unit 18. The advancement of the scrap by these belts and rollers is intermittent and the, periods of rest between advance movements are so timed as to prevent any forward feeding action except when the shear blades are opened apart, as required, to properly receive it.

As the advancing scrap material reaches the position of the hold down belt 18, it is engaged by the crawler tread plates 18s which coact with belt 11 and rollers 25—25, to hold and advance the pieces as positively held between them, into the entrance or mouth of the shear.

The shear head 17 is reciprocally vertically actuated, under timer control, for definite opening and closing movements, according to the requirements of material being fed thereto. Also the periods of advancement of scrap material by the belts 11 and 18 and rollers are timed to coincide with the opening movements of the shear, and the extent of the advance is regulated or adjusted as necessary by controls shown in FIG. 10, for the cutting of scrap into pieces of a predetermined length.

The use of the feed rollers 25—25 in conjunction with the feed belt 11 and unit 18 is of importance in this operation since it has previously been quite difficult to positively advance the scrap from the discharge end of belt 11 into the mouth of the shear. The fact that these rollers are driven and the space between them spanned by plates 26 as shown in FIG. 9, and because the belt unit 18 overlaps the rollers 25—25 to terminate immediately adjacent the mouth of the shear, has overcome the difficulties of feeding, including that clogging, experienced in machines not equipped with the rollers 25—25.

The motors for driving and synchronizing belt travel with periods of closing of the shear may be controlled manually or automatically. The automatic controls disclosed in FIG. 10 will now be described:

The hydraulic system presently preferred, as schematically shown in FIG. 10 comprises a source of power such as the motor $a$ which drives a hydraulic pump $b$ supplying a selected hydraulic pressure medium to a directional valve $d$ which is controlled by solenoid actuators designated at $e$ and $f$. Fluid that is directed by control valve $d$ is applied to the hydraulic cylinders 60—60 opposing the weight of unit 18. Check valve $i$ interposed on the system restricts flow of fluid returning from the retracting cylinders 60—60, directing to the variable needle valve $h$. Valve $c$ is a fluid relief valve serving to control maximum system pressure.

The system operates in the following manner:

Fluid pressure medium as pumped from a storage reservoir $j$ through line 100 by pump $b$ passes through line 102 and enters port $p$ of valve $d$. With neither of the solenoid actuators $e$ or $f$ energized, flow of medium passes out through port $t$ through line 103, line 108, and line 109, returning to storage reservoir $j$.

When actuator $e$ is energized fluid from line 102 is directed through port A, through line 104 and check valve $i$ to line 111 and line 112 entering cylinders 60—60 and extending their rods 61—61 thereby lifting the unit 18. Exhausting fluid returns through line 105 and enters port B of valve $d$ passing out through port $t$, through line 103, line 108 and line 109 returning to reservoir $j$. Part of the returned fluid in line 105 by-passes valve $d$ through line 106.

When solenoid actuator $e$ is de-energized, the spool of valve $d$ is spring returned to center position as shown, and movement of cylinders 60—60 ceases.

To lower the unit 18 to act on the scrap material passing beneath it on conveyor 11, solenoid actuator $f$ of valve $d$ is energized. Fluid being pumped by pump $b$ through line 102 is directed to port B of valve $d$, passing directly into line 105 and flowing through line 106, line 108, and line 109 to return to the reservoir $j$. Part of this flow in line 5 is directed to the rod ends of cylinders 60—60 to make up the void occurring from retraction of pistons and rods in the cylinders, as gravity causes drop of the unit 18. Fluid being forced from the head ends of the cylinders by the drop of the unit 18 flows through line 112 into needle valve $h$ which restricts the return of flow of this fluid and thereby controls the rate of drop of the unit 18.

It is further to be understood that instead of feeding the scrap material to the shear by means of the present feed belt 11, I may likewise employ an oscillating feed conveyor means, which by its action would advance the scrap progressively therealong to a position at which it would be engaged and advanced by the hold down belt 18, across the driven rolls 25—25 and into the mouth of the shear. The feature of the present mechanism resides principally in the coaction of the feed unit 18 and rollers 25—25 to pick up and positively advance the scrap material from the conveyor means to the shear at a designated interval with the opening of its jaws, and the holding of the advanced scrap against kick back.

It is also of importance that the hold down belt may be reversed, should it be found necessary to pull scrap from the shear in event of a jam occurring therein. If desired, pressure may be employed in the hydraulic system to provide a positive hold down on the scrap.

The controlling of the feed belt movement as by means shown in FIG. 11 is also of importance to successful operation.

What we claim to be new is:

1. Means for feeding scrap metal pieces of promiscuous shapes and sizes to a metal shear; said means comprising a conveyor belt guideway structure leading horizontally to the shear, a driven feed belt operating along said guideway structure for the conveyance and delivery of scrap metal thereon to said shear, a driven scrap hold down belt assembly extending above and beyond the discharge end portion of said feed belt to travel therewith and to bear downwardly against scrap material as it is advanced by and between said belt and belt assembly to the shear; said hold down belt assembly comprising a rigid belt guiding trackway structure, a sprocket wheel rotatably mounted at an end of said structure, a belt spanning the width of said scrap conveyor belt mounted on said structure and said wheel, a supporting cross-shaft extended transversely through and rotatably mounting said trackway structure at a location spaced from said wheel and adjacent the middle of said structure for the endwise teetering of said trackway structure thereon at various angles of said conveyor belt guideway structure in its exerting of downward pressure of scrap advanced between the belts, means pivotally mounted on said conveyor belt supporting guideway and pivotally mounting the opposite ends of said cross-shaft for the upward and downward movement of said belt assembly under the influence of scrap advanced between the belts, said last mentioned means comprising a pair of arms located in alignment at opposite sides of said conveyor belt guideway structure with ends pivotally attached thereto with said arms extending upwardly and in the direction of travel of advancing scrap and pivotally mounting the opposite ends of said cross-shaft therein for retaining the position of the hold-down belt assembly while permitting its upward and downward movement in the advancement of scrap between the belts, and a feed roller and plate means mounted beyond the discharge end of said conveyor belt structure beneath the belt assembly for the intermitttent feeding of the scrap metal pieces fed thereto.

2. A scrap feeding means according to claim 1 wherein said scrap hold down belt has paired driving sprocket wheels mounted on a drive shaft in the belt guiding trackway structure, a belt driving motor supported by said paired pivotally mounted arms and operatively connected with said drive shaft for driving said hold down belt, and means for reversing the driving direction of said drive shaft.

3. A scrap feeding mechanism according to claim 1 wherein paired hydraulic cylinders are mounted on the conveyor belt guideway structure at opposite sides of the conveyor belt and have their piston rods pivotally connected to said paired arms; said cylinders being operable for lifting said arms to clear the holddown belt from the advancing scrap or for drawing it down against the advancing scrap.

References Cited by the Examiner

UNITED STATES PATENTS

| | | | |
|---|---|---|---|
| 707,778 | 8/1902 | Himoff | 146—154 |
| 1,759,709 | 5/1930 | Peterson | 198—165 |
| 1,947,728 | 2/1934 | Mitchell | 241—92 |
| 2,014,947 | 9/1935 | McCulloch et al. | 83—913 |
| 2,969,095 | 1/1961 | Brookhyser et al. | 144—249 |
| 3,039,343 | 6/1962 | Richards | 83—694 |
| 3,118,338 | 1/1964 | Barley | 83—461 |

FOREIGN PATENTS

| | | |
|---|---|---|
| 365,997 | 1/1932 | Great Britain. |
| 591,080 | 8/1947 | Great Britain. |

WILLIAM W. DYER, Jr., *Primary Examiner.*

ANDREW R. JUHASZ, *Examiner.*